(12) United States Patent
Murphy

(10) Patent No.: US 11,175,033 B2
(45) Date of Patent: Nov. 16, 2021

(54) SWIVEL HEAD ASSEMBLY FOR AN OXY-FUEL TORCH

(71) Applicant: Dan A. Murphy, Two Harbors, MN (US)

(72) Inventor: Dan A. Murphy, Two Harbors, MN (US)

( * ) Notice: Subject to any disclaimer, the term of this patent is extended or adjusted under 35 U.S.C. 154(b) by 85 days.

(21) Appl. No.: 16/600,702

(22) Filed: Oct. 14, 2019

(65) Prior Publication Data

US 2020/0124279 A1  Apr. 23, 2020

Related U.S. Application Data

(60) Provisional application No. 62/746,624, filed on Oct. 17, 2018.

(51) Int. Cl.
*F23D 14/42* (2006.01)
*F23D 14/54* (2006.01)

(52) U.S. Cl.
CPC ............. *F23D 14/42* (2013.01); *F23D 14/54* (2013.01)

(58) Field of Classification Search
CPC .......... F23D 14/42; F23D 14/54; F23D 14/52; B23K 7/00
See application file for complete search history.

(56) References Cited

U.S. PATENT DOCUMENTS

| 2,574,100 | A | * | 11/1951 | Gettys | B23K 7/001 266/68 |
| 2,623,576 | A | * | 12/1952 | De Jong | F23D 14/42 239/424.5 |
| 3,206,180 | A | * | 9/1965 | Grubish | B23Q 27/00 266/57 |
| 3,314,667 | A | * | 4/1967 | Hammon | B23K 7/00 266/74 |
| 3,975,003 | A | | 8/1976 | Buford | |
| 4,068,833 | A | | 1/1978 | Buford | |
| 4,092,016 | A | * | 5/1978 | Roeder | B23K 7/001 266/77 |
| 5,849,243 | A | | 12/1998 | Cononie | |
| 2011/0003261 | A1 | | 1/2011 | Goss et al. | |
| 2020/0124279 | A1 | * | 4/2020 | Murphy | F23D 14/54 |

* cited by examiner

*Primary Examiner* — Scott R Kastler
(74) *Attorney, Agent, or Firm* — Schroeder & Siegfried, P.A.

(57) ABSTRACT

A swivel head assembly for a dual head oxy-fuel torch which incorporates a fixed oxygen delivery head and a 360 degree rotatable fuel delivery head mounted coaxially upon the oxygen delivery head, such that regardless of whether the torch is pushed forward, drawn backward or manipulated to either side, the fuel delivery head can be readily repositioned relative to the oxygen delivery head so as to always lead the delivery of oxygen for preheating, thus accommodating ease of arm movement and avoiding the need for cumbersome body movement and positioning around the target cutting surface.

21 Claims, 5 Drawing Sheets

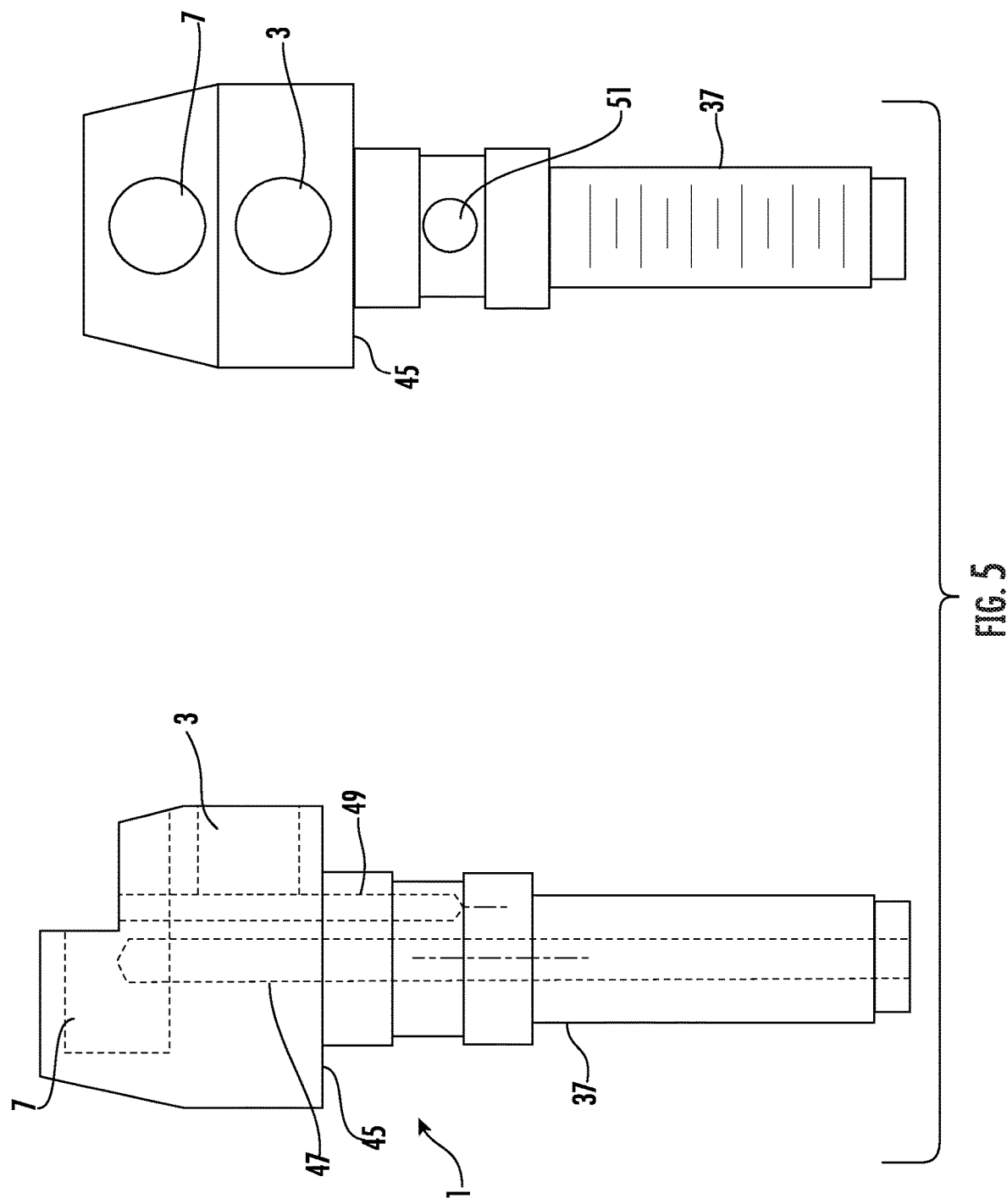

SWIVEL HEAD ASSEMBLY FOR AN OXY-FUEL TORCH

CROSS REFERENCE TO RELATED APPLICATIONS

This application is a nonprovisional patent application which claims the benefit of U.S. Provisional Application Ser. No. 62/746,624, filed on Oct. 17, 2018, entitled "Swivel Head Assembly For An Oxy-Fuel Torch," the contents of which is incorporated herein in its entirety by reference thereto.

FIELD OF INVENTION

The present invention relates to a torch assembly for a fuel source, and more particularly to the type of oxy-fuel cutting torch assembly in which the delivery head for the fuel supply is separate from the delivery head for the oxygen source, and a means for improved manipulation of the same.

BACKGROUND

The statements in this section merely provide background information related to the present disclosure and may not constitute prior art.

It has long since been common practice to use oxy-fuel torches for a wide variety of uses involving pipe fitting and surface preparation, including cutting, soldering and brazing of metal and plastic materials, as well as numerous other uses requiring the application of applied heat. With such torches, one of four basic fuel gases are generally utilized, namely, 1) acetylene, 2) propane, 3) natural gas, or 4) propylene. Of these fuels, acetylene is typically the most popular because of it high burning temperature (about 5800° F. to 6300° F.).

With most standard oxy-fuel cutting torches, sources of fuel and oxygen are fed through separate conduits to a single delivery head or nozzle. Actually, in practice a metered amount of oxygen is mixed with the source of fuel, but for purposes of the present disclosure, we will simply refer to this as the "fuel." The fuel and oxygen exit the delivery head through separate orifices, with the oxygen generally being dispensed through a central orifice in the head, and the fuel through a plurality of surrounding orifices. While this type of torch head is sufficient for basic cutting operations, it is not particularly well suited for applications requiring very fine, clean cuts. Since the fire surrounds the oxygen delivered, the oxy-fuel mixture coming from a single delivery head tends to make a broader, less precise cut.

For finer cuts, it has been found that oxy-fuel cutting torches of the type having separate delivery heads for fuel and oxygen are better suited. One such device is known as the Dillon/Henrob/Cobra or DHC 2000. With these torches, the fuel and oxygen delivery heads are typically fixed at an angle relative to one another, with the fuel delivery head positioned to lead the oxygen as the torch is manipulated for cutting. Manipulation of the oxygen head to follow the flame produces an optimal clean cut since the flame is directed immediately in front of the oxygen to preheat the metal. On the other hand, sideways manipulation of such a torch, or movement in a direction leading away from the flame, produces less desirable results due potentially to inadequate preheating conditions. Therefore, since the relative positioning of the separate delivery heads remains fixed, manipulation of the torch in different directions can be cumbersome, making it difficult to provide an accurate cut.

It is evident, therefore, that there is a need in the industry for an oxy-fuel cutting torch of the two-head type in which the fuel delivery head can be readily adjusted relative to the oxygen delivery head, to provide optimal directional control and manipulation of the torch during cutting operations. It is with these objectives in mind, and more, that I have developed my improved swivel head for oxy-fuel torch assemblies, as will be described in more detail below.

SUMMARY

In furtherance of the foregoing objectives, the present invention is comprised generally of an improved adjustable delivery head assembly for use in connection with the type of oxy-fuel cutting torch having separate delivery heads for dispensing fuel and oxygen, respectively. More specifically, the present invention incorporates a fuel delivery head which is constructed and adapted to provide 360 degree swivel or pivotal movement about the dispensing axis of the oxygen delivery head.

Similar to a conventional two-head cutting torch, the source of fuel and source of oxygen are supplied via a pair of dispensing conduits projecting from the body of the torch to a delivery head assembly. The torch body carries valves for controlling the flow of the fuel and oxygen to the delivery head assembly. The delivery head assembly includes a first delivery head for dispensing oxygen, and a second delivery head for dispensing fuel, typically acetylene.

In one exemplary embodiment, it is contemplated that the oxygen delivery head be fixed in orientation relative to the torch body, generally at a right angle to the longitudinal axis of the torch body and dispensing conduits. The distal end of the oxygen delivery head terminates in a first tapered removable nozzle which is threaded upon the tubular body of the oxygen delivery head in a manner typical to the industry. The fuel delivery head, on the other hand, is comprised of a 360 degree rotatable sealed collar member that is carried by the tubular body of the oxygen delivery head, in coaxial relation thereto. Consequently, the fuel delivery head is capable of 360 degree rotational manipulation around the oxygen delivery head. Therefore, the torch operator may swivel the fuel delivery head during use to any angular position relative to the oxygen delivery head, as desired or necessary to facilitate ease of operation.

To accomplish the foregoing, the rotatable sealed collar of the fuel delivery head forms a sealed chamber around the tubular body portion of the oxygen delivery head. Fuel delivered from the fuel dispensing conduit enters the sealed chamber of the fuel delivery head through a separate internal conduit in the delivery head assembly. From this sealed chamber, the fuel is pushed through an outwardly extending hollow flange to the terminal nozzle of the fuel delivery head. The terminal fuel nozzle is mounted in fluid communication to the hollow flange, with its outlet port pointing generally at an angle toward the tip of the oxygen nozzle.

Accordingly, upon lighting the fuel, flames generated from the fuel delivery head will draw close to or intersect the flow of dispensed oxygen at a predetermined location adjacent the target cutting surface. During use, the operator may easily adjust the fuel delivery head to any position, 360 degrees around the oxygen delivery head, so as to always maintain the flames in a preheating leading position to the flow of oxygen. Regardless of whether the torch is pushed forward, drawn backward or manipulated to either side, the fuel delivery head can be readily repositioned relative to the oxygen delivery head, so as to always lead the delivery of oxygen for preheating, thus accommodating ease of arm movement and avoiding the need for cumbersome body movement and positioning around the target cutting surface.

The foregoing and additional features and advantages of the present invention will be more readily apparent from the following detailed description. It should be understood, however, that the description and specific examples herein are intended for purposes of illustration only and are not intended to limit the scope of the present disclosure.

DRAWINGS

The drawings described herein are for illustration purposes only and are not intended to limit the scope of the present disclosure in any way.

FIG. 5 is a diagrammatic illustration showing the internal oxygen and fuel conduits extending through the body of the delivery head assembly.

DETAILED DESCRIPTION

Figure 1:
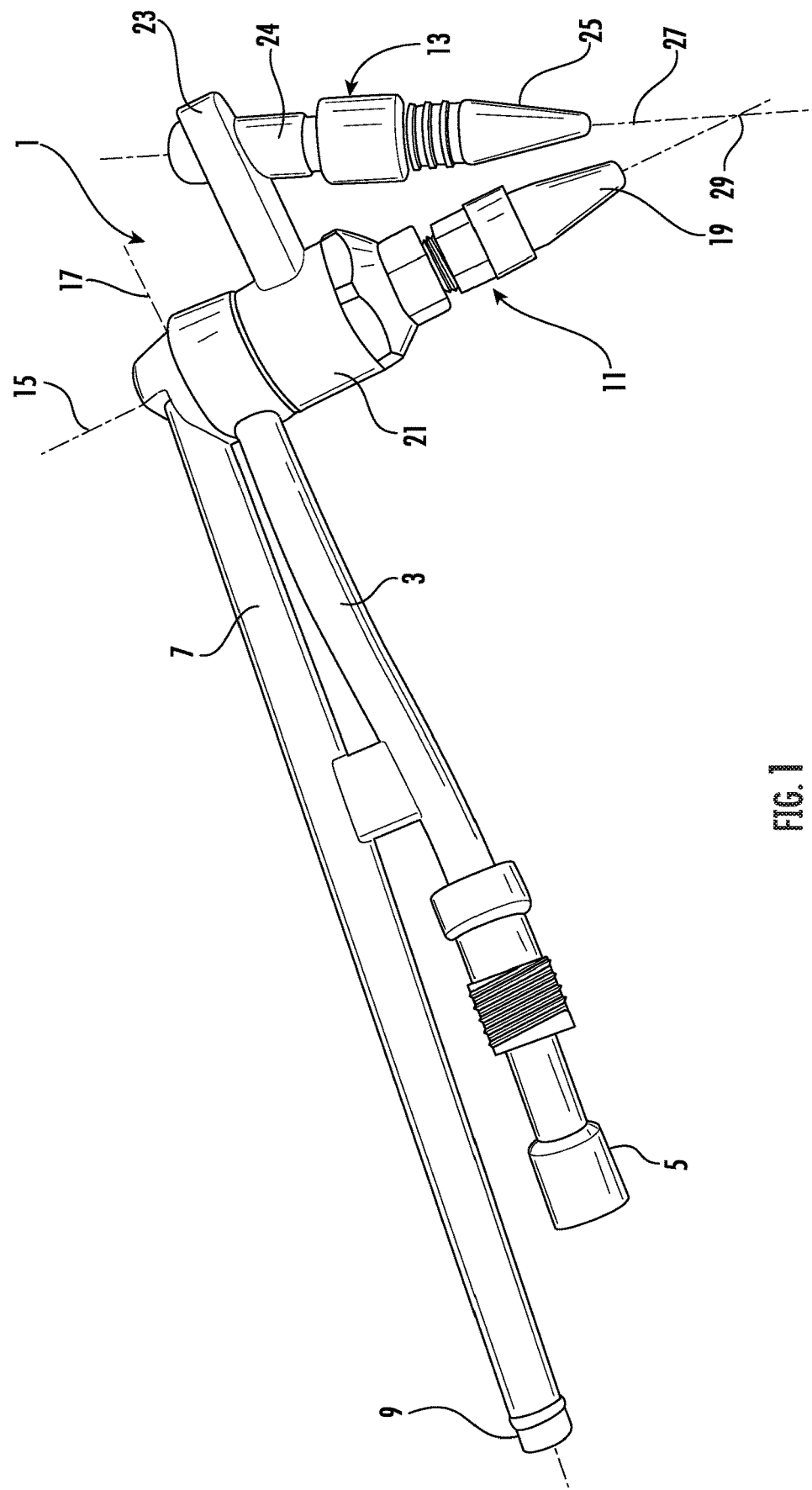
FIG. 1 is a side elevation photograph of a swivel head assembly for an oxy-fuel torch which embodies the principles of my invention, showing the fuel delivery head positioned in one orientation relative to the oxygen delivery head.

The following description is merely exemplary in nature and is not intended to limit the present disclosure, application, or uses. It should be understood that throughout the drawings, corresponding reference numerals indicate like or corresponding parts and features.

Figure 2:
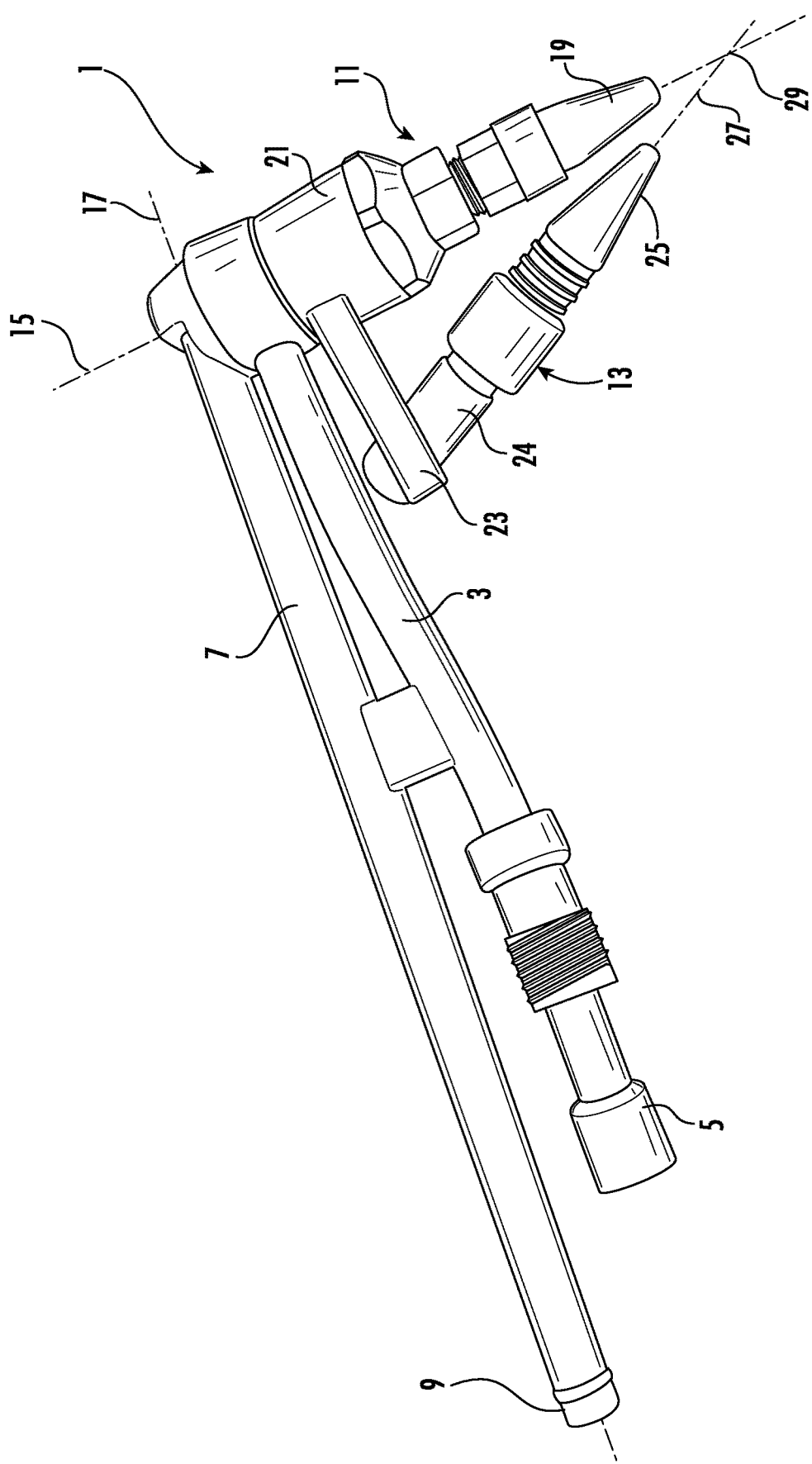
FIG. 2 is a side elevation photograph of the swivel head assembly shown in FIG. 1, showing the fuel delivery head pivoted to a different orientation relative to the oxygen delivery head.

With reference now to FIGS. 1 and 2 of the drawings, an exemplary embodiment is shown of a delivery head assembly 1 for use with a cutting torch which incorporates the principles of the present invention. As shown, similar to most conventional two-head cutting torches, the source of fuel and source of oxygen are supplied via a pair of dispensing conduits 3 and 7, respectively, projecting from the body of the torch (not shown) to the delivery head assembly 1. Conduit 3 includes a fitting 5 for connecting to the source of fuel (not shown), and conduit 7 includes a fitting 9 for connecting to the source of oxygen (not shown). As noted previously, in a conventional manner, the torch body carries valves (not shown) for controlling the flow of the fuel and oxygen to the delivery head assembly 1.

The delivery head assembly 1, in turn, includes a first delivery head 11 for dispensing oxygen, and a second and separate delivery head 13 for dispensing fuel, typically acetylene. While not intending to limit the scope of the present invention, the oxygen delivery head 11 shown in FIGS. 1 and 2 is fixed in orientation relative to the torch body. In the present embodiment, the oxygen delivery head 11 is positioned such that its axis 15 extends generally at a right angle to the longitudinal axis 17 of the dispensing conduits 3 and 7 leading from the torch body. Of course, other relative orientations of the oxygen delivery head 11 are conceivable without departing from the scope of the invention herein, but a 90 degree orientation is generally the most common in the industry. As shown, the distal end of the oxygen delivery head 11 terminates in a first tapered removable nozzle 19. The tapered nozzle 19 directs the flow of oxygen to the target point on the cutting surface.

The fuel delivery head 13, on the other hand, is not fixed in orientation. The fuel delivery head 13 is comprised of a 360 degree rotatable sealed collar member 21 that is carried by the oxygen delivery head 11, in coaxial relation thereto. As best shown in FIGS. 1 and 2, the fuel delivery head 13 includes an outwardly extending hollow flange conduit 23 which feeds the fuel through downwardly extending tubular shaft 24 to a second tapered removable nozzle 25. As shown, the tubular shaft 24 and fuel nozzle 25 of the fuel delivery head 13 are oriented at an angle relative to the oxygen delivery head 11, such that the axis 27 of the fuel delivery head 13 intersects the axis 15 of the oxygen delivery head 11 adjacent the desired target point 29 of the cutting surface. Consequently, the fuel delivery head 13 is capable of 360 degree rotational manipulation around the oxygen delivery head 11. The torch operator may swivel the fuel delivery head 13 during use to any angular position relative to the oxygen delivery head 11, as desired or necessary to facilitate ease of operation.

Figure 3:
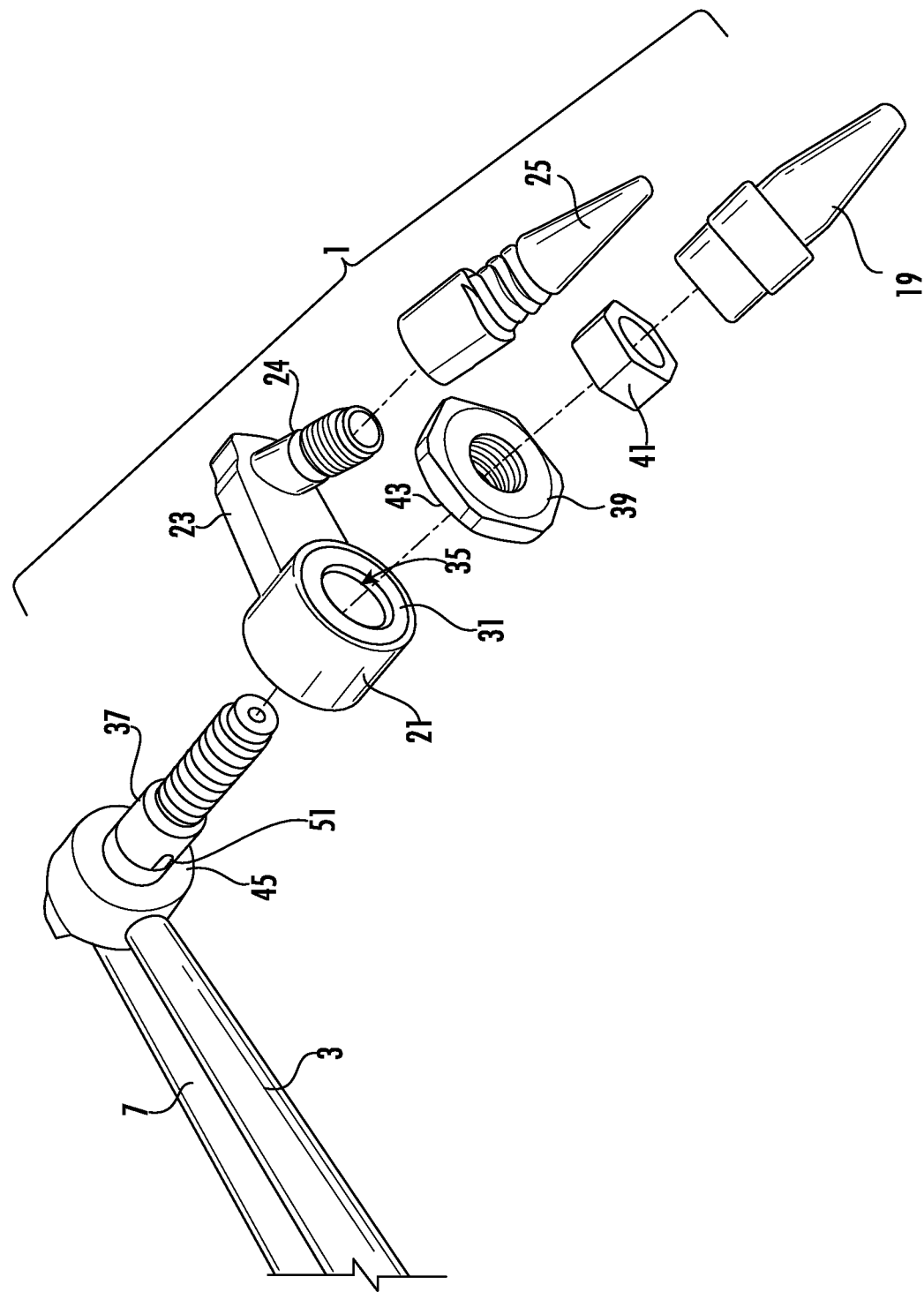
FIG. 3 is a photograph of the swivel head assembly shown in FIG. 1, showing the various components of the assembly unassembled and separated for illustration.
Figure 4:
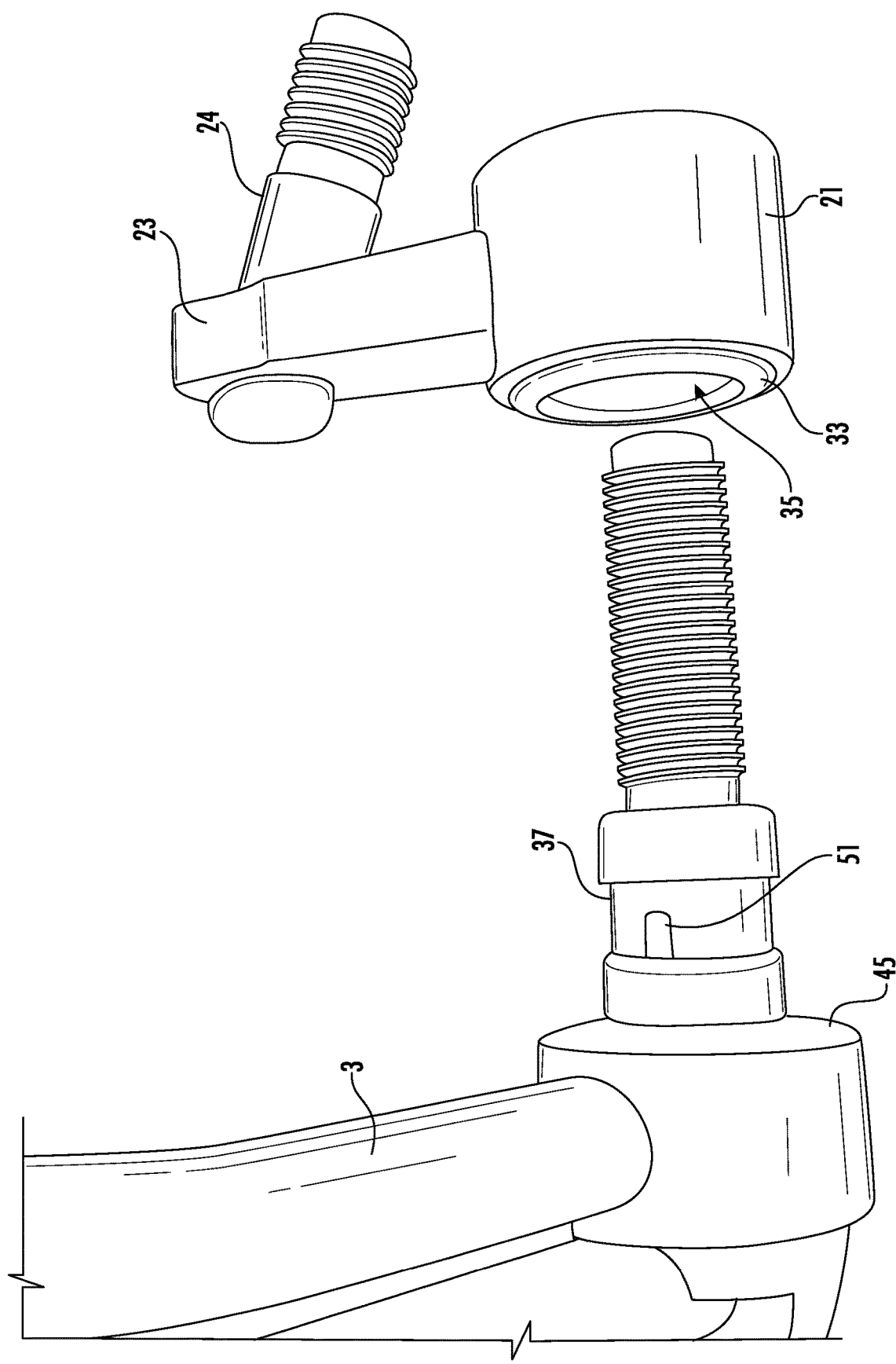
FIG. 4 is a close-up photograph of the threaded tubular body of the oxygen delivery head, showing the fuel input port leading to the swivel collar of the fuel delivery head.

To accomplish the foregoing, as best shown in FIGS. 3 and 4, the rotatable sealed collar 21 of the fuel delivery head 13 includes a pair of opposing seals 31 and 33, one positioned on either side of the collar 21. The seals 31 and 33 function to form a sealed interior chamber 35 around the tubular body portion or shaft 37 of the oxygen delivery head 11 when assembled. As shown best in FIG. 3, a major portion of shaft 37 is threaded and adapted to receive a sealing nut 39 and locking nut 41 which bear against the distal end of collar 21 when assembled. Thus, when assembled and tightened as shown in FIGS. 1 and 2, the back surface 43 of the sealing nut 39 bears against seal 31, and seal 33 is pushed against surface 45 of the delivery head assembly 1, thereby forming sealed chamber 35 within the rotatable collar 21 of the fuel delivery head 13. With this, the fuel delivery head 13 is free to swivel 360 degrees around the stationary oxygen delivery head 11, and can be manipulated as desired or necessary for optimal positioning and cutting during use.

As shown in FIG. 5, oxygen dispensed from an oxygen source enters the delivery head assembly 1 from the oxygen dispensing conduit 7. The oxygen dispensing conduit 7 is connected in fluid communication with the internal conduit 47 formed by the tubular body portion 37 of the oxygen delivery head 11, thus providing on-demand oxygen to the cutting surface in a conventional manner known in the art. Fuel entering the delivery head assembly 1 is delivered through fuel dispensing conduit 3, where it connects in fluid communication to a separate internal conduit 49 within the delivery head assembly 1. As seen in FIG. 5, the internal conduit 49 extends downwardly partly through the delivery head assembly 1, and terminates at an outlet port 51 formed in the upper end of shaft 37 adjacent to where the rotatable collar 21 seats. Accordingly, as shown best in FIGS. 4 and 5, fuel flowing through internal conduit 49 will enter the sealed chamber 35 of the rotatable collar 21 through outlet port 51. From sealed chamber 35, the fuel exits through the outwardly extending hollow flange 23 to the terminal nozzle 25 of the fuel delivery head 13.

As shown best in FIGS. 3 and 4, the terminal end of tubular shaft 24 is threaded to accommodate the female threaded nozzle 25 of the fuel delivery head 13. Similarly, the terminal end of tubular shaft 37 is threaded to accommodate the female threaded nozzle 19 of the oxygen delivery head 11. Therefore, the oxygen nozzle 19 and fuel nozzle 25 are readily removable and replaceable, as desired or necessary, for use in a variety of different applications.

Accordingly, upon lighting the fuel, flames generated from the fuel delivery head 13 will draw close to or intersect the flow of dispensed oxygen from the oxygen delivery head 11 at a predetermined location 29 adjacent the target cutting surface. During use, the operator may easily adjust the fuel delivery head 13 to any position, 360 degrees around the oxygen delivery head 11, so as to always maintain the flames in a preheating leading position to the flow of oxygen. By way of example, FIG. 1 illustrates one possible orientation where the fuel delivery head 13 is positioned away from the torch body. In this position, the flame from the fuel delivery head 13 will lead the oxygen dispensed from the oxygen delivery head 11 when the torch is pushed away from the user. FIG. 2, on the other hand, illustrates another possible orientation where the fuel delivery head 13 is positioned closest to the torch body. In this position, the flame from the fuel delivery head 13 will lead the oxygen dispensed from the oxygen delivery head 11 when the torch is pulled toward the user. Regardless of whether the torch is pushed forward, drawn backward or manipulated to either side, the fuel delivery head 13 can be readily repositioned relative to the oxygen delivery head 11 so as to always lead the delivery of oxygen for preheating, thus accommodating ease of arm movement and avoiding the need for cumbersome body movement and positioning around the target cutting surface.

What is important to note with the present invention is that the fuel delivery head 13 and oxygen delivery head 11 may be easily manipulated and repositioned relative to one another such that the fire from the torch always leads the delivery of oxygen when cutting. Although the foregoing discussion focuses primarily on movement of the fuel delivery head 13 about the oxygen delivery head 11, it is certainly conceivable that the oxygen delivery head 11 could be constructed in a similar manner to swivel about the fuel delivery head 13, and obtain similar results. Regardless of the relative movement between the fuel and oxygen delivery heads, use of the present invention provides a means by which the user of a torch may manipulate and maneuver the delivery of oxygen and fuel about a cutting surface, with the fuel delivery leading the oxygen, in any direction through simple arm movement and adjustment of the swivel delivery head system 1, without the user having to readjust his/her body position.

The disclosure herein is intended to be merely exemplary in nature and, thus, variations that do not depart from the gist of the disclosure are intended to be within the scope of the disclosure. Such variations are not to be regarded as a departure from the spirit and scope of the disclosure, which comprises the matter shown and described herein, and set forth in the appended claims.

The invention claimed is:

1. A delivery head assembly for use with a cutting torch, comprising:
    (a) a first delivery head for delivering a source of oxygen to a cutting surface along a first axis;
    (b) a second delivery head for delivering a primary source of cutting fuel to said cutting surface along a second axis;
    (c) one of said first delivery head and said second delivery head being rotatable about the other said delivery head such that delivery of said cutting fuel is positionable to always precede delivery of said oxygen along said cutting surface; and
    (d) said second delivery head includes a collar member which surrounds a portion of said first delivery head in movable relation thereto, and creates a sealed chamber through which said fuel may pass.

2. A delivery head assembly for use with a cutting torch, comprising:
    (a) a first delivery head for delivering a source of oxygen to a cutting surface along a first axis;
    (b) a second delivery head for delivering a source of fuel to said cutting surface along a second axis; and
    (c) one of said first delivery head and said second delivery head forming a sealed movable chamber around the other said delivery head to facilitate angular adjustment of said first delivery head and said second delivery head relative to one another.

3. The delivery head assembly of claim 2, wherein said second delivery head is rotatably carried by said first delivery head to permit said second delivery head to swivel about said first delivery head.

4. The delivery head assembly of claim 3, wherein said orientation of said second axis is adjustable relative to said first axis.

5. The delivery head assembly of claim 3, wherein said second delivery head is rotatable 360 degrees about said first delivery head.

6. The delivery head assembly of claim 2, wherein said second delivery head includes a collar member which surrounds a portion of said first delivery head in movable relation thereto, thereby creating said sealed chamber through which said fuel may pass.

7. The delivery head assembly of claim 6, wherein said collar encircles a shaft portion of said first delivery head and includes a pair of opposing end seals which bear against said first delivery head to form said sealed chamber.

8. The delivery head assembly of claim 6, including separate conduits through which said oxygen and said fuel flow, said conduit for said fuel being routed through a portion of said first delivery head to said sealed chamber.

9. The delivery head assembly of claim 1, wherein said second delivery head is positioned such that said second axis has an orientation which intersects said first axis, and said orientation of said second axis is adjustable 360 degrees around said first axis.

10. The delivery head assembly of claim 1, wherein said second delivery head is comprised of a 360 degree rotatable collar that is carried by and in sealed relation to said first delivery head.

11. A delivery head assembly for use with a cutting torch, comprising:
    (a) a first delivery head for delivering a source of oxygen to a cutting surface along a first axis;
    (b) a second delivery head for delivering a source of fuel to said cutting surface along a second axis;
    (c) said second delivery head having a collar which surrounds a portion of said first delivery head, said collar forming a sealed chamber around said portion of said first delivery head through which fuel may pass; and
    (d) said collar being rotatable around said first delivery head to facilitate angular adjustment of said second delivery head relative to said first delivery head.

12. The delivery head assembly of claim 11, wherein said collar is constructed to swivel 360 degrees around said first delivery head.

13. The delivery head assembly of claim 11, wherein said collar encircles a shaft portion of said first delivery head and includes a pair of opposing end seals which bear against said first delivery head to form said sealed chamber.

14. The delivery head assembly of claim 13, wherein said shaft portion of said first delivery head has an orifice which opens into said sealed chamber through which said fuel may flow to said second delivery head.

15. The delivery head assembly of claim 11, including separate conduits through which said oxygen and said fuel flow, said conduit for said fuel being routed through a portion of said first delivery head delivery to said sealed chamber.

16. The delivery head assembly of claim 11, wherein said second delivery head is positioned such that said second axis has an orientation which intersects said first axis.

17. The delivery head assembly of claim 11, wherein said first delivery head and said second delivery head terminates with a tapering replaceable nozzle.

18. The delivery head assembly of claim 17, wherein said nozzles are threadedly connected respectively to their said first and second delivery heads.

19. A method of delivering oxygen and fuel from a cutting torch to a cutting surface, comprising the steps of:
  (a) providing a first delivery head for delivering a source of oxygen to the cutting surface along a first axis;
  (b) providing a second delivery head for delivering a source of fuel to the cutting surface along a second axis;
  (c) mounting said second delivery head upon a collar which surrounds a portion of said first delivery head and is rotatable around said first delivery head, said collar forming a sealed chamber around said portion of said first delivery head through which fuel may pass to said second delivery head;
  (d) delivering oxygen to said cutting surface through said first delivery head;
  (e) delivering fuel to said cutting surface through said second delivery head via passage through said sealed chamber formed around said portion of said first delivery head.

20. The method set forth in claim 19, including the step of adjusting the angular position of said second delivery head relative to said first delivery head as needed to position said second delivery head in a leading position on said cutting surface as the cutting torch is maneuvered.

21. The delivery head assembly of claim 20, wherein said step of adjusting the angular position of said second delivery head includes rotating said collar about said first delivery head to change the position of said second delivery head relative to said first delivery head.

\* \* \* \* \*